US011927918B2

(12) United States Patent
Rey-Mermet et al.

(10) Patent No.: US 11,927,918 B2
(45) Date of Patent: Mar. 12, 2024

(54) TROCHOIDAL DISPLAY MECHANISM

(71) Applicant: Manufacture d'Horlogerie Audemars Piguet SA, Le Brassus (CH)

(72) Inventors: Gilles Rey-Mermet, Le Sentier (CH); Sylvain Cornibé, Chêne-en-Semine (FR)

(73) Assignee: Manufacture D'Horlogerie Audemars Piguet SA, Le Brassus (CH)

( * ) Notice: Subject to any disclaimer, the term of this patent is extended or adjusted under 35 U.S.C. 154(b) by 656 days.

(21) Appl. No.: 17/254,023

(22) PCT Filed: Jun. 18, 2019

(86) PCT No.: PCT/IB2019/055105

§ 371 (c)(1),
(2) Date: Dec. 18, 2020

(87) PCT Pub. No.: WO2019/244035

PCT Pub. Date: Dec. 26, 2019

(65) Prior Publication Data

US 2021/0141341 A1 May 13, 2021

(30) Foreign Application Priority Data

Jun. 18, 2018 (CH) ................................ CH00768/18

(51) Int. Cl.
*G04B 19/02* (2006.01)
*G04B 19/08* (2006.01)

(52) U.S. Cl.
CPC ............. *G04B 19/02* (2013.01); *G04B 19/08* (2013.01)

(58) Field of Classification Search
CPC ................................ G04B 19/02; G04B 19/08
See application file for complete search history.

(56) References Cited

U.S. PATENT DOCUMENTS

| | | | | |
|---|---|---|---|---|
| 5,280,461 A * | 1/1994 | Belik | G04B 45/00 368/228 |
| 9,182,743 B2 | 11/2015 | Rochat et al. | |
| 10,222,749 B2 | 3/2019 | Denden et al. | |

FOREIGN PATENT DOCUMENTS

| | | | |
|---|---|---|---|
| CH | 692257 A | 4/2002 | |
| CH | 698141 B1 * | 5/2009 | G04B 27/04 |

(Continued)

OTHER PUBLICATIONS

International Search Report for PCT/IB2019/055105, dated Nov. 13, 2019, 2 pgs.

*Primary Examiner* — Edwin A. Leon
*Assistant Examiner* — Kevin Andrew Johnston
(74) *Attorney, Agent, or Firm* — Blank Rome LLP

(57) ABSTRACT

The invention relates to a mechanism for displaying an information for a timepiece, comprising a mobile (10) intended to be driven in rotation by the movement of the timepiece about a display axis (17), a satellite (20) pivoted on the mobile (10) about a satellite axis (27) parallel to the display axis (17) and remote from a non-zero distance d1 thereof, a display area (80), an indicator (50) secured to the satellite (20) and the position of which relative to the display area (80) provides the information, and a crown (30) centered on the display axis (17) and kinematically connected to the satellite (20). The mechanism is particular in that the indicator (50) is located at a distance d2 from the satellite axis (27), which is greater than or equal to the distance d1.

11 Claims, 3 Drawing Sheets

(56) References Cited

FOREIGN PATENT DOCUMENTS

| | | | | | |
|---|---|---|---|---|---|
| CH | 702133 | B1 | | 5/2011 | |
| CH | 708264 | A2 | | 12/2014 | |
| CH | 711236 | A2 | * | 12/2016 | |
| CN | 2072237 | U | | 2/1991 | |
| CN | 107092180 | A | | 8/2017 | |
| DE | 29903950 | U1 | * | 5/1999 | ............. G04B 19/02 |
| DE | 29905074 | U1 | | 7/1999 | |
| EP | 2544055 | A1 | | 1/2013 | |
| EP | 2993532 | A2 | * | 3/2016 | ............. G04B 19/02 |
| GB | 1400914 | A | | 7/1975 | |

* cited by examiner

TROCHOIDAL DISPLAY MECHANISM

RELATED APPLICATIONS

The present application is a national phase of International Patent Application No. PCT/IB2019/055105, filed Jun. 18, 2019, which claims priority of Swiss Patent Application No. CH 00768/18, filed Jun. 18, 2018. The contents whereof are incorporated hereby in their entirety.

TECHNICAL FIELD

The present invention relates to a trochoidal display mechanism, notably for a timepiece.

STATE OF THE ART

In horological technology, several examples of display mechanisms capable of moving a mobile device along a non-circular closed trajectory are known. These displays are sought when there is a desire to offer a display of novel and original form, to follow the form of an elongate dial, or else to give a display a special appeal allowing it to be easily distinguished.

The document EP2993532 describes for example a hand that pivots about an axis of revolution. The hand is mounted on a mobile which follows an elliptical trajectory about the center of the watch, driven by a mechanism which comprises a pivoting arm and a differential gear. The hand is constantly aligned with the center of the watch.

CH708264 proposes a different solution in which the movement is obtained by a mechanism comprising articulated levers, whereas CH702133 proposes a solution of a similar problem based on a planetary system with a gear train in the planetary. Other embodiments, notably DE29905074, use mobile elements sliding in grooves of free form.

DE29903950 proposes a display mechanism in which the indicator is a point on a face of a toothed wheel which runs inside a crown, so as to generate trochoidal, hypotrochoidal or epitrochoidal trajectories.

The known systems which allow the generation of non-circular trajectories of the hand are often bulky and complex and/or do not allow the display to be produced on the periphery of the dial which makes the reading of the information difficult and imprecise.

BRIEF SUMMARY OF THE INVENTION

One aim of the present invention is to propose a hypo- or epi-trochoidal display that is free of the limitations of the known devices.

According to the invention, this aim is achieved by the subject matter of the main claim, and notably by means of a mechanism for displaying information for a timepiece comprising a mobile intended to be driven in rotation by the movement of the timepiece about a display axis, a satellite pivoted on the mobile about a satellite axis parallel to the display axis and offset by a non-zero distance d1 from the display axis, a display area, an indicator secured to the satellite and whose position relative to the display area supplies the information, a crown centered on the display axis and kinematically linked to the satellite. In a novel manner, the display indicator is situated at a distance d2 from the satellite axis greater than or equal to the distance d1.

In other words, the mobile pivots in the direction opposite to that of the indicator. In the conventional case where the information is displayed in the clockwise direction, the mobile therefore pivots in the counterclockwise direction. By comparison to the prior art, the invention offers the advantage of allowing the information to be displayed at the periphery of the display area by increasing the distance traveled by the indicator which simplifies and increases the accuracy of the reading of the information. Alternatively, for a given display size, the invention makes it possible to offer a drive mechanism of reduced size.

According to an advantageous embodiment, the distance d2 is greater than the distance d1+r which makes it possible to obtain a trajectory of the indicator entirely on the outside of the circle defined by the crown.

Other advantages of the invention, objects of the dependent claims, will become apparent on reading the description.

SHORT DESCRIPTION OF THE FIGURES

Examples of implementation of the invention are indicated in the description illustrated by the attached figures in which.

Figure 1:
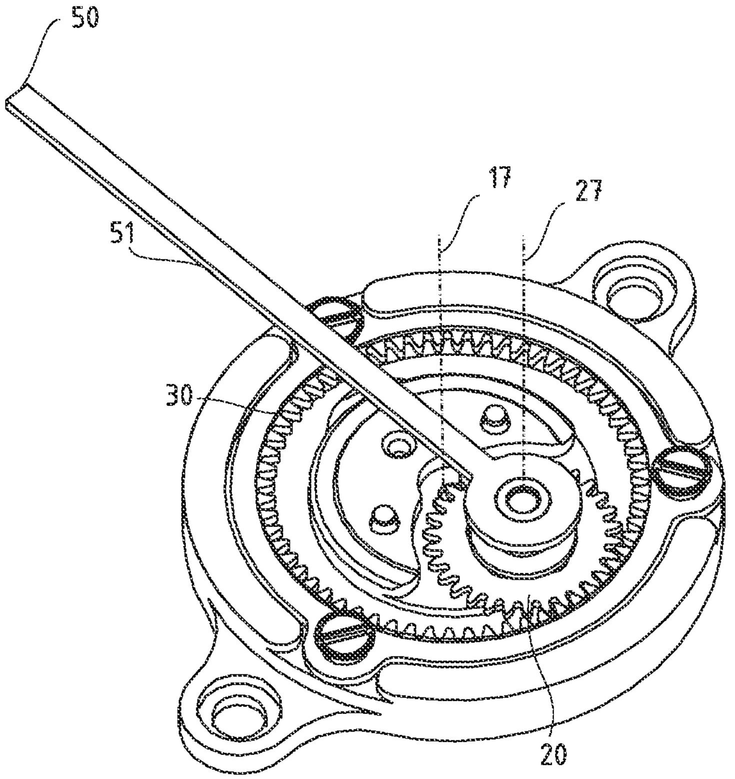
FIG. 1 illustrates an embodiment of a display according to the invention, seen on the dial side.
Figure 2:
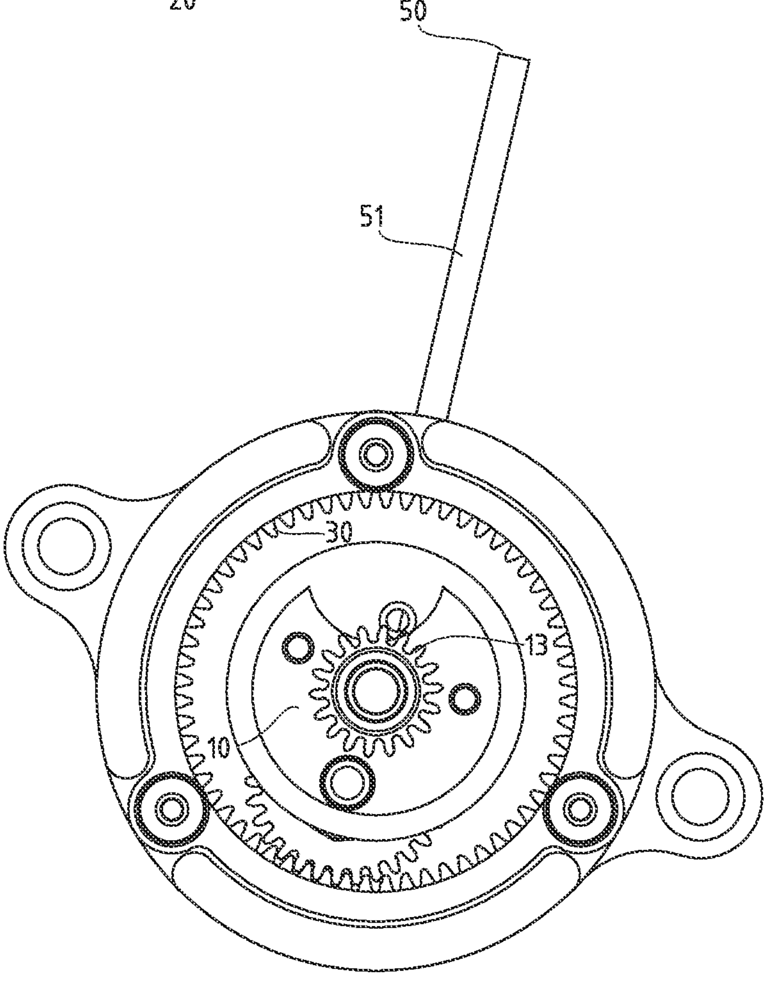
FIG. 2 is a view of the mechanism of FIG. 1 on the plate side.
Figure 3A:
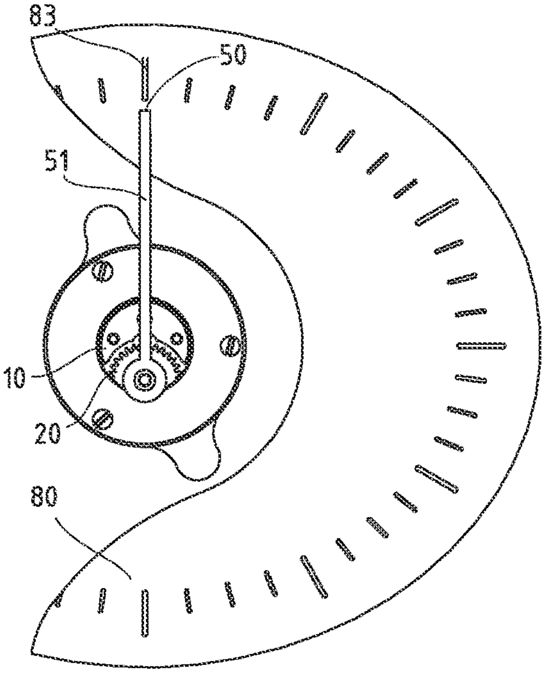
Figure 3B:
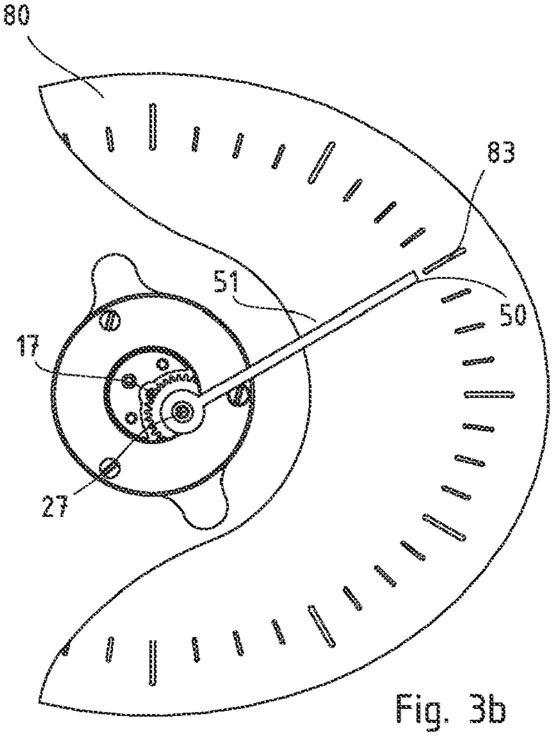
Figure 3C:
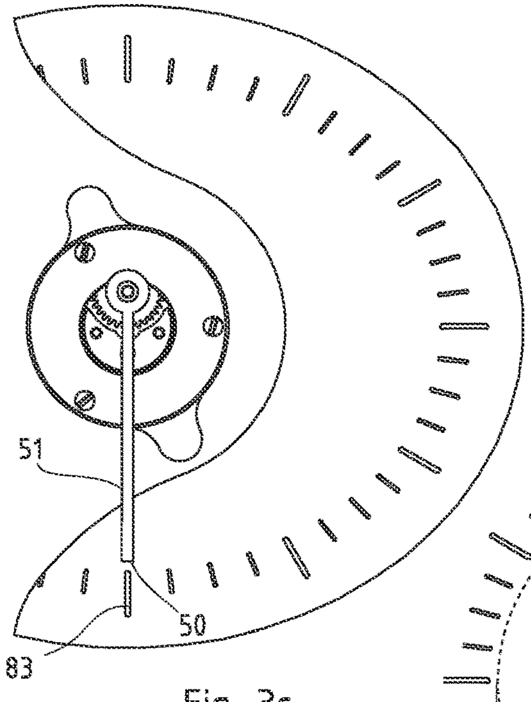

FIGS. 3*a* to 3*c* illustrate the display mechanism of the invention respectively at 12, 2 and 6 o'clock.

Figure 4:
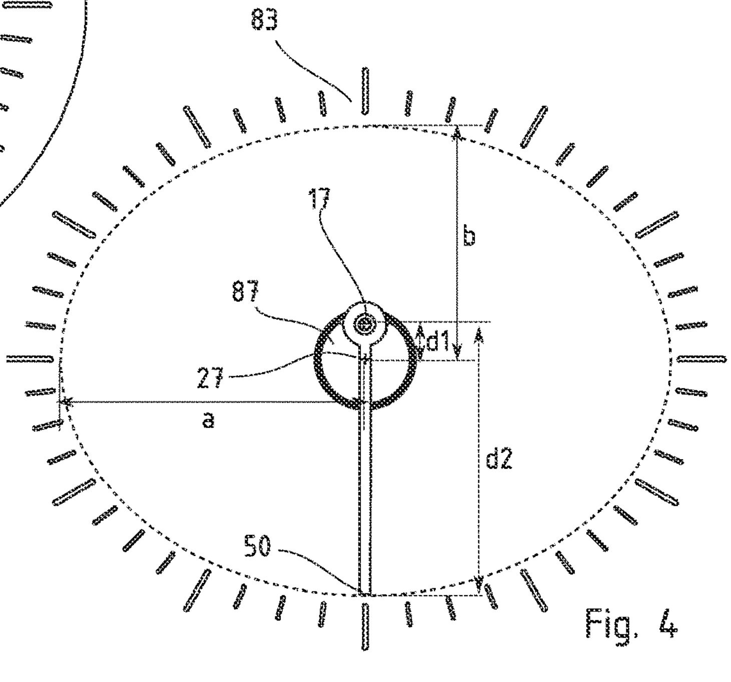

FIG. 4 illustrates the dial of a watch comprising the display mechanism of the invention.

Figure 5:
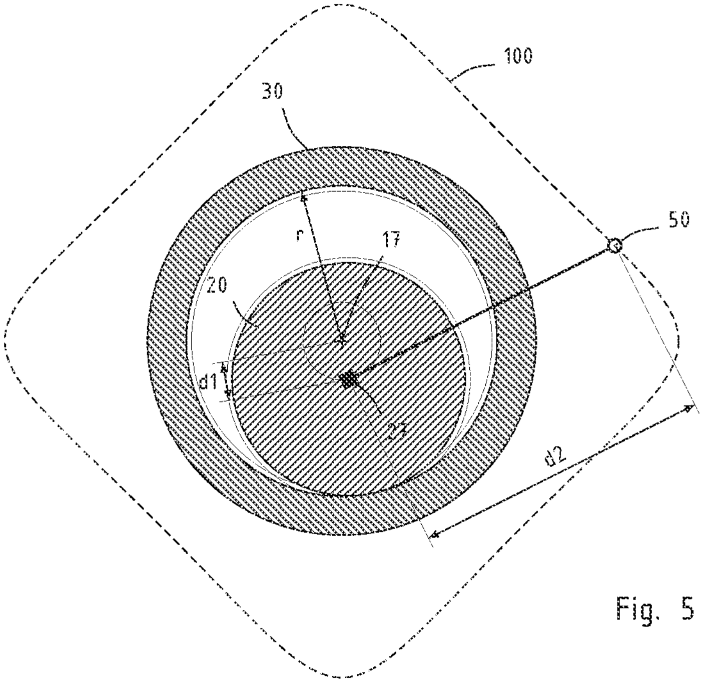
Figure 6:
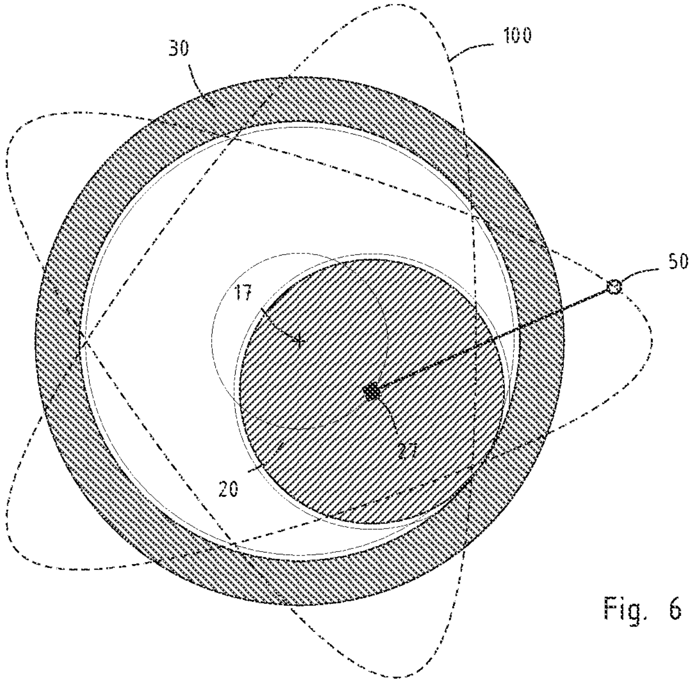

FIGS. 5 and 6 schematically present two variants in which the trajectory described by the indicator is a non-circular curve with a cyclical symmetry, respectively four-fold and five-fold.

EXEMPLARY EMBODIMENT(S) OF THE INVENTION

Referring to the attached FIGS. 1 to 4, the display mechanism comprises a mobile 10 which is driven in rotation by the movement of a horological mechanism. In the example illustrated, this drive is obtained by the pinion 13 secured to the mobile 10 and cooperating with a non-illustrated wheel of a horological movement, but other drive means are also possible.

The mobile 10 pivots about the display axis 17 which, as will be seen hereinbelow, is the central axis of the ellipse on which the display is produced. The mobile 10 bears an eccentric axis or bearing to which there is fixed a satellite wheel 20, capable of pivoting about the satellite axis 27. A hand 51 is united securely to the satellite 20. The point of the hand 51 constitutes an indicator 50 whose position relative to a display area 80 supplies the information to be displayed. In the example presented, the display area 80 is the dial of the timepiece. The latter comprises indexes 83 for more easily and accurately determining the position of the indicator 50 with reference to the display area 80.

A circular crown 30 is positioned concentrically on the display axis 17 and cooperates with the satellite 20. In a preferred variant, the crown 30 is fixed and the reduction ratio of this gear is 1÷2, in that the number of teeth of the crown 30 is twice that of the satellite 20, such that, when the mobile 10 turns by a given angle in a direction relative to the display area, the satellite 20 turns, relative to the mobile 10, by twice that angle in the opposite direction.

The resultant of these two opposing rotations is that the satellite 20 turns, relative to the display area 80, by an angle equal to and opposite that of the mobile 10. The trajectory described by the indicator depends on its position relative to the axes of the display and of the satellite. According to a particular aspect of the invention, the distance d2 between the indicator and the satellite axis 27 is greater than or equal to the distance d1 between the display axis 17 and the satellite axis 27. The result thereof for the indicator 50 is an elliptical trajectory in the opposite direction to that of the mobile 10.

If, as in the example illustrated, the distance d2 is greater than the sum of d1 and of the radius r of the crown 30, the trajectory described by the indicator 50 is entirely outside of the crown 30.

In the example presented, the mechanism makes it possible to display time information such as the hour, the minute or the second. FIGS. 3*a* to 3*c* illustrate three positions of the display with the dial partially represented to reveal the mechanism. In FIG. 3*a*, the satellite axis 27 is at 6 o'clock, while the indicator 50 indicates 12 o'clock. FIG. 3*b* illustrates the position of the display at 2 o'clock: the mobile 10 has turned by 60° in the counterclockwise direction and the hand by 120° in the clockwise direction with respect to the mobile 10. The result is a rotation of the indicator 50 in the clockwise direction of 60°, as is expected for a hand indicating 2 o'clock, with a counterclockwise circular displacement to the right and upward of the origin of the hand.

FIG. 3*c* illustrates the position of the display at 6 o'clock. The mobile 10 has performed a half counterclockwise rotation, and the hand a half clockwise rotation relative to the dial.

FIG. 4 illustrates a possible embodiment of a watch dial according to the invention. Advantageously, a cover 87 of circular form is secured to the mobile 10 and has a piercing colinear with the satellite axis 27 for the axis of the hand 51 to pass through. The cover 87 is located inside an aperture of the dial and at the same level as the latter. The cover 87 makes it possible to conceal the satellite wheel 20 and the crown 30 to give the impression that the origin of the hand "strolls around" in the central region of the dial.

It can be noted that the indicator 50 describes an ellipse with a major half-axis a=d2+d1 and a minor half-axis b=d2−d1.

Nor is the invention limited to the case of a satellite wheel driving a hand. Variants can also be conceived in which the satellite 20 itself has a visible characteristic point, or drives a mobile with a characteristic point, or any other indicator or display means.

Other non-circular curves can be obtained, in the context of the invention, by choosing a transmission ratio other than 1÷2 between the crown 30 and the wheel 20. It is in fact possible to produce a more general class of curves in which the ellipse corresponding to the ratio 1÷2 between the crown 30 and the wheel 20 is only a particular case. FIG. 5 shows an example in which the reduction ratio between the crown 30 and the satellite 20 is 3÷4 (to simplify, only the primitive circles are represented). The satellite 20 bears an indicator 50 describing a curve with a four-fold cyclical symmetry, with four substantially straight sides and rounded corners. During a display cycle, the indicator 50 describes a trajectory 100 whose form can be modified by varying the distance d2 relative to the dimensions of the wheels 20 and 30: an elongation gives rise to a more rounded trajectory. Preferably, the distance d2 will be chosen such that the curve 100 is entirely outside of the primitive circle of the crown 30, but that is not an essential characteristic of the invention.

Generally, the mechanism allowing the indicator 50 to describe a curve comprising a single loop and n+1 vertices is obtained when, during a display cycle, the satellite 20 performs n+1 rotations with reference to the mobile 10 while the mobile 10 performs n rotations in the opposite direction with reference to the display area. That corresponds, when the crown 30 is fixed, to a ratio of n/(n+1) between the satellite wheel 20 and the crown. n=1 is the case presented in FIGS. 1 to 3 and gives an elliptical trajectory. n=2 would give a ratio of 2/3 and a trajectory of triangular form. n=3 is the particular case of FIG. 5 in which the mobile 10 describes three revolutions about the axis 17 when the satellite 20 performs four revolutions with respect to the mobile 10.

It will also be understood that it would be possible to produce other trajectories by choosing different ratios between the dimension of the crown 30 and of the satellite 20, the ratios 4÷5, 5÷6 producing pentagonal, hexagonal, etc. trajectories which can be adapted to the most diverse dial forms.

The reduction ratio mentioned above can be expressed by non-consecutive integer numbers: in this case, the indicator 50 performs several revolutions about the display axis 17 during a display cycle and the trajectory 100 exhibits several loops which cross one another. The number of revolutions of the indicator corresponds to the difference between the number of rotations of the satellite with respect to the mobile 10 and the number of rotations of the mobile 10 with respect to the display area.

The example of FIG. 6 shows a variant of the invention in which the ratio is 3÷5. During a display cycle, the satellite 20 turns five times with reference to the mobile 10 while the latter turns three times about the axis 17. The indicator 50 thus describes a trajectory 100 comprising two revolutions and in the form of a five-pointed star.

The invention allows for an infinite number of variants that are not represented. A ratio of 5÷7, for example, would produce an interleaved trajectory with seven substantially straight sides and rounded corners. A ratio of 5/8 would produce a trajectory with three revolutions and eight vertices, etc.

By increasing the number of revolutions, the length of the trajectory 100 is increased, which makes it possible to improve the legibility and the precision of the information displayed.

In a variant that is not represented, the indicator 50 is situated at a distance d2 equal to d1 and then describes a linear trajectory.

It is possible to combine the display of the invention with a retrograde mechanism in order to produce a retrograde display with the trajectory and position that can easily be adapted.

According to a particular aspect of the invention, the crown is not fixed, but is intended to be driven in rotation about the display axis 17 by the movement. That for example makes it possible to reduce the size of the satellite wheel without modifying the kinematics of the indicator and to clear the center of the display. That also makes it possible to produce a mechanism with two inputs for displaying differential information such as the power reserve.

The mechanism of the invention makes it possible to produce displays of original forms with a notable economy of means, and therefore lends itself particularly well to the production of a watch of purist appearance. Moreover, the mechanism occupies a space contained at the center of the dial; it is therefore possible to advantageously combine it with other peripheral displays with disks or with small hands, to create a complicated watch.

REFERENCE NUMBERS EMPLOYED IN THE FIGURES

10 mobile
13 drive wheel
17 display axis
20 satellite
27 satellite axis
30 crown
50 indicator
51 hand
80 display area
83 index
87 cover
a major half-axis
b minor half-axis
d1 17, 27 center-to-center distance
d2 distance from the indicator to the satellite axis 27

The invention claimed is:

1. A mechanism for displaying information for a timepiece comprising:
- a mobile arranged to be driven in rotation by a movement of the timepiece about a display axis,
- a satellite pivoted on the mobile about a satellite axis parallel to the display axis and offset by a non-zero first distance from the display axis,
- a display area,
- an indicator secured to the satellite and whose position relative to the display area supplies the information,
- a crown of a determined radius, centered on the display axis and linked kinematically to the satellite,
- wherein the display indicator is situated at a second distance from the satellite axis greater than or equal to the first distance, and wherein the mobile pivots in the counterclockwise direction with reference to the display area.

2. The display mechanism of claim 1, wherein the second distance is greater than the first distance and of the radius.

3. The display mechanism of claim 1, wherein the crown is fixed relative to the display area.

4. The display mechanism of claim 1, wherein the crown is arranged to be driven in rotation by the movement about the display axis.

5. The display mechanism of claim 4, wherein the information displayed is the power reserve.

6. The display mechanism of claim 1, wherein the crown comprises an internal toothing meshing with the satellite.

7. The display mechanism of claim 1, arranged so that, during a display cycle, the satellite performs n+1 rotations with reference to the mobile whereas the mobile performs n rotations in the opposite direction with reference to the display area.

8. The display mechanism of claim 1, wherein the indicator is the end of a hand mounted on the satellite.

9. The display mechanism of claim 1, wherein the first distance is equal to the second distance.

10. A retrograde display comprising a display mechanism as claimed in claim 1.

11. A retrograde display comprising a display mechanism comprising:
- a mobile arranged to be driven in rotation by a movement of the timepiece about a display axis,
- a satellite pivoted on the mobile about a satellite axis parallel to the display axis and offset by a non-zero first distance from the display axis,
- a display area,
- an indicator secured to the satellite and whose position relative to the display area supplies the information,
- a crown of a determined radius, centered on the display axis and linked kinematically to the satellite, wherein the display indicator is situated at a second distance from the satellite axis greater than or equal to the first distance.

* * * * *